United States Patent Office 3,553,699
Patented Jan. 5, 1971

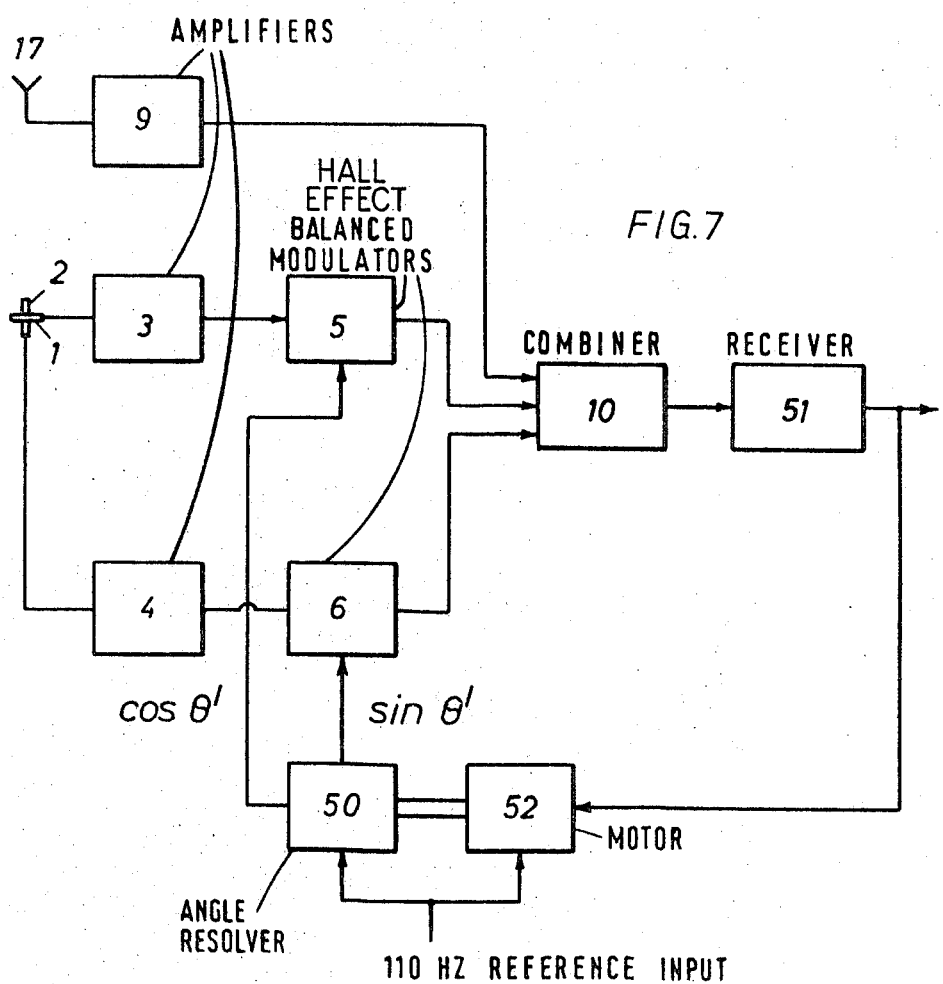

3,553,699
DIRECTION FINDING APPARATUS
Bertrand Julian Starkey, Dartmouth, Nova Scotia, and John Osborne, Boutiliers Point, Nova Scotia, Canada, assignors to E.M.I. Electronics Canada Limited, Ottawa, Ontario, Canada
Filed June 14, 1968, Ser. No. 737,101
Claims priority, application Great Britain, June 20, 1967, 28,494/67
Int. Cl. G01s 3/30
U.S. Cl. 343—121                                 4 Claims

ABSTRACT OF THE DISCLOSURE

There is provided direction finding apparatus comprising a plurality of antennae for deriving signals from a source, the bearing angle of which is to be determined, means for producing a local oscillation the frequency of which is relatively low compared with that of the derived signals, Hall effect modulating means for producing output signals proportional to the derived signals multiplied by functions of the local oscillation and means for producing an indication of the bearing of the source in response to the outputs of the modulating means. In two forms of the invention Hall effect elements are incorporated in either a rotating field resolver or a goniometer, whereby the elements operate as balanced modulators for producing output signals proportional to the current therein multiplied by functions of the local oscillation and of the resolver angle or the goniometer angle respectively.

---

Figure 1:
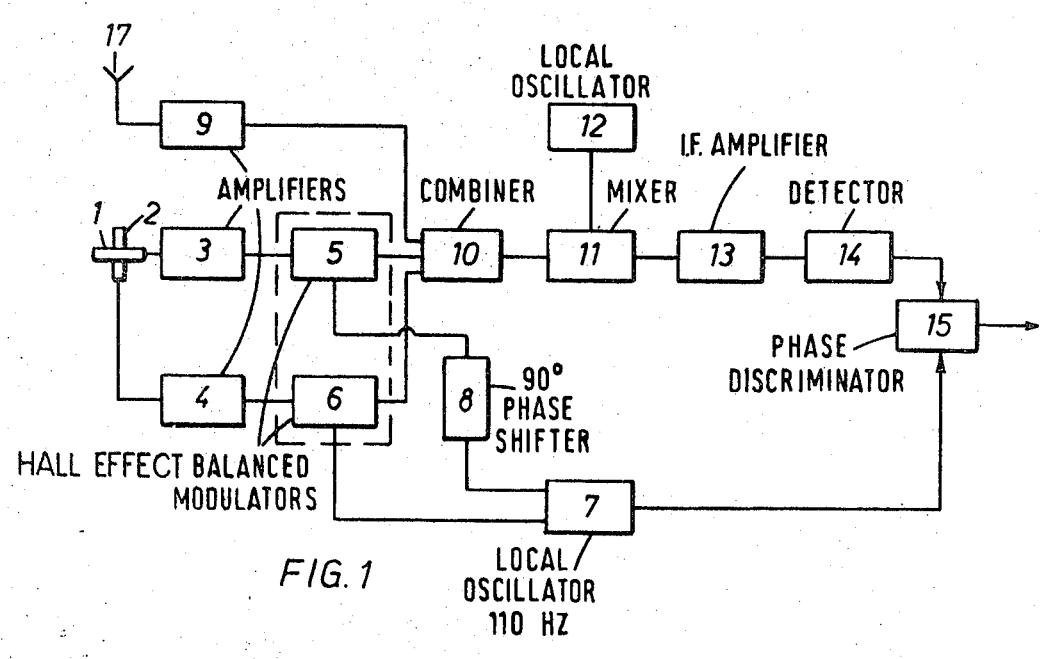

This invention relates to direction finding apparatus, especially radio direction finding apparatus.

In radio direction finding apparatus, two loop antennae are provided, mounted so that their planes of maximum response are vertical and mutually perpendicular. When located in an unmodulated radio field of angular frequency $\Omega$ an source bearing $\theta$, the antennae respectively provide output voltages of the form $$e_x = A \sin \theta \sin \Omega t$$
$$e_y = A \cos \theta \sin \Omega t$$

A third omni-directional sense antenna is also provided which provides a reference output $$e_s = B \sin \Omega t$$

The outputs $e_x$ and $e_y$ may be combined in a goniometer, by which their amplitudes are multiplied respectively by $\cos \theta'$ and $\sin \theta'$, when $\theta'$ is the goniometer angle, yielding an output $$e_g = A \sin \theta \cos \theta' \sin \Omega t - A \cos \theta \sin \theta' \sin \Omega t$$
$$= A \sin (\theta - \theta') \sin \Omega t$$

The goniometer angle is varied until $e_g$ passes through zero with $\theta = \theta'$, so that the source bearing can be determined. In one form of direction finding apparatus, the goniometer output, after being changed to intermediate frequency, is applied to a balanced modulator in which it is modulated by a low frequency locally generated signal, say 110 Hz., and then added to the sense antenna signal $e_s$. This produces an output of the following composition, in which $\cos wt$ denotes the locally generated signal:

$$A \sin (\theta - \theta') \sin \Omega t \cos wt + B \sin \Omega t$$
$$= \frac{A}{2} (\sin \theta - \theta') \{\sin (\Omega t + wt) + \sin (\Omega t - wt)\} + B \sin \Omega t$$

It can be seen that this is equivalent to a carrier wave $B \sin \Omega t$, amplitude modulated by the locally generated low frequency signal which is itself amplitude modulated (with suppressed carrier) by the factor $\sin (\theta - \theta')$. The sidebands of the locally generated signal both fall to zero and reverse in phase as the goniometer null is passed through, and so it is possible to determine the goniometer setting at which $\theta = \theta'$.

Direction finding apparatus may be required to operate over a wide frequency range, for example from 100 kHz. to 3 mHz. and the balanced modulator, if of a conventional construction, is more easily used at I.F. which requires the use of a second mixer and associated circuits. One object of the present invention is to reduce this restriction.

According to the present invention from one aspect there is provided direction finding apparatus comprising two directional antennae for receiving radio signals from a source, the bearing angle of which is to be determined, said antennae having their planes of maximum response mutually perpendicular, means for producing a local oscillation the frequency of which is relatively low compared with that of signals received by said antennae, two respective Hall effect elements to which are applied currents respectively dependent on the radio signals derived from said antennae, said Hall effect elements being incorporated in a rotating field resolver whereby said elements operate as balanced modulators for producing output signals proportional to said currents multiplied by functions of said local oscillation and of the resolver angle, and means for producing an indication of said bearing in response to said output signals.

According to the present invention from another aspect there is provided direction finding apparatus comprising two directional antennae for receiving radio signals from a source, the bearing angle of which is to be determined, said antennae having their planes of maximum response mutually perpendicular, means for producing a local oscillation the frequency of which is relatively low compared with that of signals received by said antennae, two respective Hall effect elements to which are applied currents respectively dependent on the radio signals derived from said antennae, said Hall effect elements being incorporated in a goniometer whereby said elements operate as balanced modulators for producing an output signal proportional to said currents multiplied by functions of said local oscillation and of the goniometer angle and means for producing an indication of said bearing in response to said output signals.

The Hall effect elements referred to above comprise elements each of which is such that when a control current flows through the element in one direction and a control magnetic field passes through the element on a second direction perpendicular to the first, a voltage is set up across the element in a direction perpendicular to the first and second directions. In Hall effect elements as used according to the invention, the control currents are arranged to be responsive to the signals from the respective antennae and the magnetic fields are arranged to be responsive to the locally generated oscillation. A Hall effect element is usually a semi-conductor in wafer or thin film form, comprising for example silicon, indium arsenide, or indium antimonide.

Figure 2:
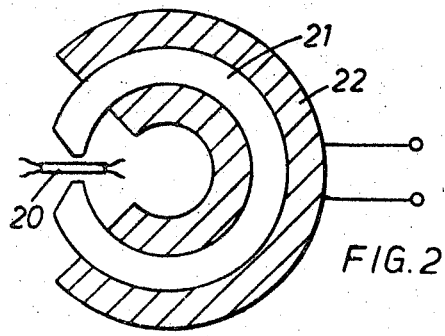
Figure 3:
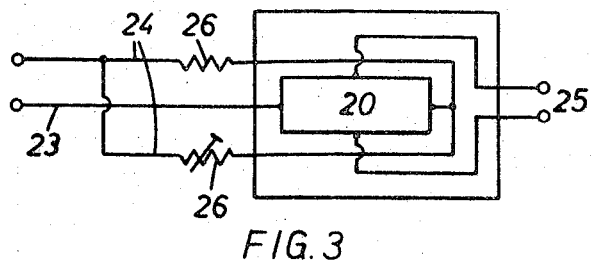
Figure 4:
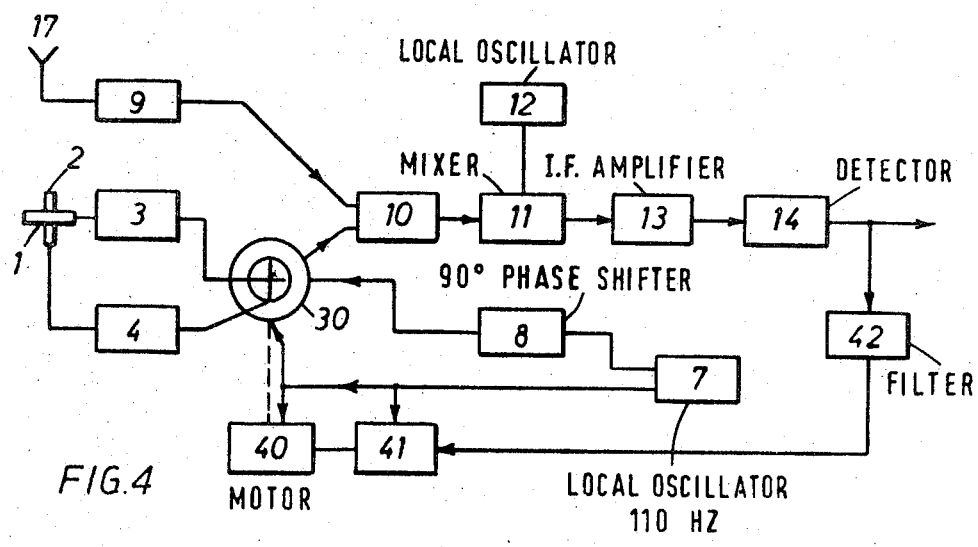
Figure 5:
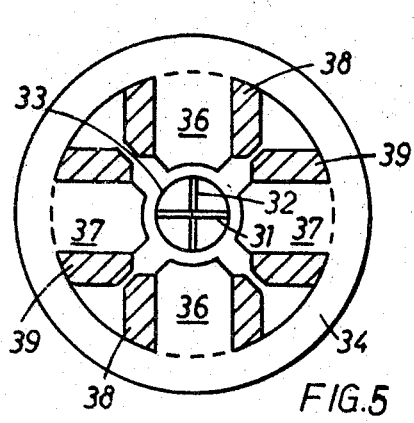
Figure 6:
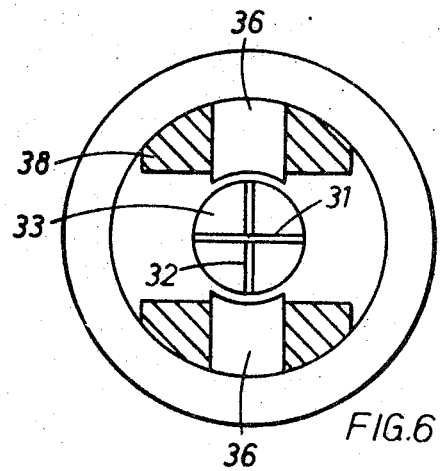

In order that the present invention may be more fully understood and readily carried into effect, it will now be described with reference to the accompanying drawings in which:

FIG. 1 illustrates one example of automatic direction finding apparatus according to the present invention, embodying Hall effect balanced modulators, FIG. 2 illustrates the construction of the Hall effect balanced modulators embodied in the apparatus illustrated in FIG. 1, FIG. 3 is a view of a detail of FIG. 1, FIG. 4 illustrates another example of automatic ratio direction finding apparatus according to the present invention, embodying Hall effect balanced modulators combined to function also as a resolver, FIG. 5 illustrates the construction of the combined modulators and resolver, and FIG. 6 illustrates combined goniometer and balanced modulator means applicable to another application of the invention, and FIG. 7 illustrates another example of radio direction finding apparatus according to the invention.

Referring to FIG. 1, the apparatus illustrated therein comprises two directional loop antennae 1 and 2, which have their planes of maximum response vertical and perpendicular to each other. The apparatus also comprises a omnidirectional sense antenna 17. Signals derived from the antennae 1 and 2 are applied to preamplifiers 3 and 4 respectively and thence to Hall effect devices 5 and 6 which are arranged to operate as balanced modulators. The amplifiers 3 and 4 are arranged to provide the control currents for the respective Hall elements of the modulators 5 and 6. A local oscillator 7 provides a low frequency local oscillation cos $wt$, of which the frequency is less than 20,000 Hz. For example, the frequency may be 110 Hz. The local oscillation is applied directly to control the magnetic field for the Hall effect element of the modulator 6. The oscillation from 7 is also applied to control the magnetic field of the Hall effect element in the modulator 5, but in this case it is first subjected to a 90° phase shift by the phase shifter 8. The signal from the sense antenna 17 is amplified in a pre-amplifier 9 and is then added in a combining circuit 10 to the outputs of the two balanced modulators. The resultant signal combination is fed to a mixing circuit 11 and mixed with the oscillation from a local oscillator 12 to produce an I.F. signal combination. After amplification in the I.F. amplifier 13, the I.F. signal combination is detected by means of an amplitude modulation detector 14, producing an output signal which can be shown to be of the form $$A \sin (wt+\theta)$$

The phase of this signal is compared in a phase discriminator circiut 15 with the phase of the oscillation from the oscillator 7. Circuit 15 might be wholly electrical or include electro-mechanical components such as a motor geared to a phase shifter. The output of this circuit which may be electrical or in the form of a mechanical shaft rotation will represent the bearing angle. The electrical output could be processed by a central digital computer if available.

The circuit 15 has not been shown in detail and various techniques for processing the signal output are possible. For example, to achieve accuracy and reliability with compactness, the phase difference between the output of the detector 14 and the output of the local oscillator 7 may be measured and compensation applied, using digital data processing. The result may then be displayed on a non-rotating indicator of bearing, for example by means of an electro-luminescent or numerical display.

FIGS. 2 and 3 illustrate a suitable construction of a balanced modulator for use as either of the modulators 5 and 6 of FIG. 1. According to the figures, a Hall element 20 is located as shown between the pole faces of a gapped toroidal core 21 of magnetic material. The core carries a winding 22 to which is applied the low frequency oscillation from the oscillator 7 so as to set up a varying magnetic field whose direction is normal to the plane of the Hall element 20. Assuming that the modulator shown in FIG. 2 is the modulator 5 of FIG. 1, current from the amplifier 3 is applied as indicated along the element by means of leads 23 and 24, the lead 24 being divided so that one part of it lies along each side of the element. The output signal of the balanced modulator is the voltage set up between the longitudinal edges of the element 20, this voltage being taken from the terminals 25. The division of the current lead 24 reduces inductive coupling between the input circuit and the output circuit and resistors 26, at least one of which is adjustable, are provided in the two parts of the lead 24 to enable inductive pick-up to be substantially balanced out.

The apparatus shown in FIGS. 1, 2 and 3 has the advantage that it does not need to use any moving parts.

FIGS. 4 and 5 illustrate another direction finding apparatus which depends on a phase comparison technique to derive the desired output signal but it uses a conventional mechanical indicator, this being made possible by embodying the Hall effect elements in a device which operates in a rotating field resolver. Corresponding parts of FIG. 4 and FIG. 1 are indicated by the same numerals. The two balanced modulators are however incorporated in the rotating field resolver 30, which as shown in FIG. 5 comprises two Hall elements 31 and 32 mounted on a stator 33 so that their planes are mutually perpendicular. The stator 33 is surrounded by a rotatable armature 34 fitted with two pairs of pole pieces 36, 36 and 37, 37 which are orthogonal to each other. The pole pieces 36 carry windings 38 and the pole pieces 37 carry windings 39. The oscillation from the low frequency oscillator 7 is applied directly to the windings 38 and through the phase shifter 8 to the windings 39. The outputs of the sense antennae 1 and 2 controls the currents applied to the Hall elements 31 and 32 respectively. When the angular displacement of the armature 34 is zero, the magnetic field between the pole pieces 36 is normal to the plane of the element 31 and similarly the magnetic field between the pole pieces 37 is normal to the plane of the Hall element 32. The angular displacement $\theta'$ of the armature 34 can be controlled by motor 40, which is driven in response to the output of a phase discriminator 41 which compares the phase of the oscillation from 7 with the phase of the output of detector 14, after the latter has been passed through a suitable filter 42, which passes only components of the frequency of the oscillator 7.

Assume that the armature 34 has been rotated by the motor 40 through an angle $\theta'$ from the position represented in FIG. 5.

The magnetic field set up by windings 38 and 39, has a component normal to the element 31 proportional to:

$$\cos \theta' \cos wt + \sin \theta' \sin wt$$

and has a component normal to the element 32 proportional to:

$$\cos \theta' \sin wt - \sin \theta' \cos wt$$

The currents applied to the elements 31 and 32 are respectively A sin $\theta$ sin $\Omega t$ and A cos $\theta$ sin $\Omega t$. The sum of the output voltages of the Hall elements, is proportional to:

$$A \sin \theta [\cos \theta' \cos wt + \sin \theta' \sin wt] \sin \Omega t$$
$$+ A \cos \theta [\sin \theta' \cos wt - \cos \theta' \sin wt] \sin \Omega t$$
$$= A [\sin \theta \cos (wt-\theta') + \cos \theta \sin (wt-\theta')] \sin \Omega t$$
$$= A \sin (wt+\theta-\theta') \sin \Omega t$$

It can then be shown that the output of the filter 42 is of the form $$A \sin (wt+\theta-\theta')$$

and the control of the motor 40 is such that the motor rotates the armature 34 of the resolver 30 so as to tend to make the $\theta'=\theta$. When this condition is satisfied, the angular displacement of the armature is a mechanical indication of the bearing of the source of the signal sensed by the atennae 1, 2 and 17.

The pole pieces 36 and 37 of the resolver shown in FIG. 5 may be made of ferrite or possibly iron dust material, and the armature 34 may be made of high permeability metal.

The invention can also be applied to the type of automatic direction finiding apparatus described in the second paragraph of this specification, in which Hall effect balanced modulators are combined to form a goniometer. In this case the Hall effect elements may be arranged as illustrated in FIG. 6. The arrangement shown in FIG. 6 is similar to that shown in FIG. 5 but the armature 34 carries only a single pair of pole pieces 36 provided with windings 38. The stator is again provided with two orthogonal Hall effect elements 31 and 32. The arrangement shown in FIG. 6 is embodied in the apparatus in such a way that the currents applied to the elements 31 and 32 are responsive to the outputs of the antennae 1 and 2 respectively. Assume that the armature has an angular displacement $\theta'$, that a low frequency local oscillation $wt$ is applied to the windings 37, and that the voltage outputs of the two Hall elements are added. The resultant output is then of the form $$k (\sin \theta \cos \theta' - \cos \theta \sin \theta') \sin \Omega t \cos wt$$

When the output of the omni-directional sense antenna 17 is added to this output there is produced, as explained, an output which corresponds to a carrier wave modulated by the local low frequency signal $\cos wt$, the side bands of which both fall to zero and reverse in phase as the armature is adjusted through the angular displacement for which $\theta' = \theta$. The goniometer incorporating the balanced modulators may be located in the radio frequency stage of the apparatus.

In the example of the invention which is illustrated in FIG. 7 a synchro-resolver 50 and Hall effect balanced modulators are used instead of a goniometer. The resolver 50 has a reference input comprising the local oscillation $\cos wt$ of 110 Hz. frequency. The Hall effect balanced modulators 5 and 6 are each similar to that disclosed in FIG. 2. The signals derived from the antennae 1 and 2 form the input currents to the modulators 5 and 6 and they are multiplied respectively by the two outputs of the resolver 50, namely $\cos wt \cos \theta'$ and $\cos wt \sin \theta'$ denotes the angle of the resolver shaft. The outputs of the resolver 50 are amplified as necessary before application to the modulators 5 and 6 to control the magnetic fields therein. The output of the combining circuit 10 then corresponds to a carrier wave modulated by the local low frequency signal $\cos wt$ as explained above. The signal is applied to a receiver 51 in which the amplitude of the low frequency modulation component is detected and applied as the error signal to a zero motor 52, which controls the angle of the resolver shaft. The motor therefore tends to set the shaft at an angle such that $\theta' = \theta$, the bearing of the source of the signal picked up by the antennae 1, 2 and 17. This example of the invention has the advantage of permitting mechanical components and electrical components to be at separate locations.

The invention is also applicable to directional sonobuoy systems, and it is to be understood that the reference herein to direction finding apparatus is intended to include such systems.

What we claim is:

1. Direction finding apparatus comprising two directional antennae for receiving radio signals from a source, the bearing angle of which is to be determined, said antennae having their planes of maximum response mutually perpendicular, means for producing a local oscillation the frequency of which is relatively low compared with that of signals received by said antennae, two respective Hall effect elements to which are applied currents respectively dependent on the radio signals derived from said antennae, said Hall effect elements being incorporated in a rotating field resolver whereby said elements operate as balanced modulators for producing output signals proportional to said currents multiplied by functions of said local oscillation and of the resolver angle, and means for producing an indication of said bearing in response to said output signals.

2. Apparatus according to claim 1 in which said means for producing an indication comprises means for processing the output signals of said Hall effect elements to produce an output signal of which the phase varies as the difference of the resolver angle from the source bearing.

3. Direction finding apparatus comprising two directional antennae for receiving radio signals from a source, the bearing angle of which is to be determined, said antennae having their planes of maximum response mutually perpendicular, means for producing a local oscillation the frequency of which is relatively low compared with that of signals received by said antennae, two respective Hall effect elements to which are applied currents respectively dependent on the radio signals derived from said antennae, said Hall effect elements being incorporated in a goniometer whereby said elements operate as balanced modulators for producing an output signal proportional to said currents multiplied by functions of said local oscillation and of the goniometer angle and means for producing an indication of said bearing in response to said output signals.

4. Apparatus according to claim 3 in which said means for producing an indication comprises means for processing the output signals of said Hall effect elements to provide a carrier wave modulated by said local oscillation, the side bands of which reverse in phase when said goniometer angle passes through the condition of equality with said bearing.

References Cited

UNITED STATES PATENTS

| | | | |
|---|---|---|---|
| 2,649,574 | 7/1953 | Mason | 332—51(H) |
| 2,943,323 | 6/1960 | Ryan | 343—121X |
| 3,204,186 | 7/1965 | Capen et al. | |

OTHER REFERENCES

Wireless Direction Finding, by R. Keen, Iliffe & Sons, Ltd., London, fourth edition, 1947, pp. 868–875.

RODNEY D. BENNETT, Primary Examiner

R. E. BERGER, Assistant Examiner

U.S. Cl. X.R.

332—51; 343—124